April 2, 1929.  A. STOCK  1,707,822

MAGNETIC BALANCE

Filed March 19, 1926

Dr. Alfred Stock
by
C. P. Goepel
atty.

Patented Apr. 2, 1929.

1,707,822

UNITED STATES PATENT OFFICE.

ALFRED STOCK, OF BERLIN-DAHLEM, GERMANY.

MAGNETIC BALANCE.

Application filed March 19, 1926, Serial No. 95,830, and in Germany November 18, 1924.

The present invention relates to a balance in which magnetic forces are utilized for weighing and from the value of which the weights or deviations in weight can be derived.

Figure 1:
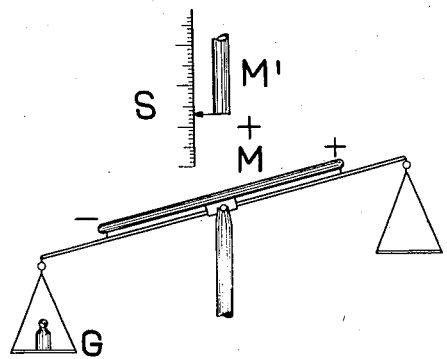
Fig. 1 represents a form of the invention in which the principle of the invention is applied to one type of weighing scale.

On the beam of the balance, (see schematic illustration Fig. 1) or inside of the hollow balance-beam, a magnet M has been provided.

If the balance, which can be made of metal, glass or any other material, is loaded on one side with the weight G and thereby moved from its position of rest, this position of rest can be re-established by bringing a pole (in this case a positive pole) of a sufficiently long second, permanent magnet M' closer to the balance. The positive pole of M' repels the positive pole of M and attracts the negative pole, thus the loaded side of the balance is raised. Associated with the magnet M' is a scale S and this scale is divided in such a manner that the value of the load G may be readily determined by noting the position of the magnet relative to the scale S.

If the permanent magnet is replaced by an electro-magnet, ascertaining of the weight is effected by measuring the current exciting the magnet.

This process can be employed in manifold ways. As very small, but still exactly measurable forces can be utilized, very sensitive balances can be obtained. A special advantage is, that the balance can be located within an entirely enclosed space, and will operate equally well in a vacuum.

Figure 2:
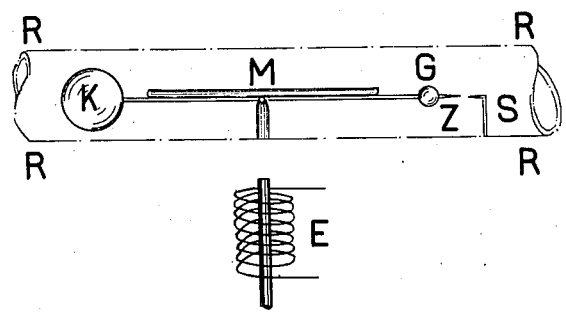
Fig. 2 represents a balance for the determination of the density of gases and other fluids.

Fig. 2 shows again schematically, how the magnetic balance may be employed for ascertaining gas-density. The balance is located in a vessel, in this case a tube R, containing the gas and it is to be ascertained, whether the said tube is gas-tight. One end of the balance-beam carries closed hollow sphere or buoy K, and the opposite end is provided with a counter-weight G and an indicator Z, opposite which a point S is provided. The magnet M is mounted intermediate the ends of the beam as previously described. In gases of different density the buoyancy of the hollow sphere K varies. The variations in the beam positions caused by the buoyancy can be compensated for magnetically as will be understood on the basis of what has been said above, that is by the use of an electromagnet E. The value of the current required to excite the magnet, sufficiently to restore the beam to normal position may be utilized to determine the gas-density.

Figure 3:
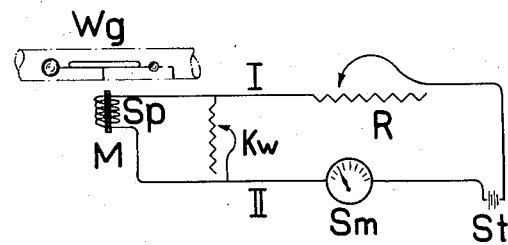
Fig. 3 represents a balance for the determination of the density of gases giving indications of the density of the gas under normal conditions of pressure and temperature.

This process, which is very simple in its performance, is for instance, adapted for technical gas-analysis, in which the density varies simultaneously with the composition of the gas. A certain difficulty arises however in consequence of the fact, that the density of a gas depends greatly upon its temperture and pressure. This drawback can be eliminated in an electro-magnetic method of ascertaining of gas-density in the following manner, (see schematic connection Fig. 3).

$Wg$ is the magnetic balance. M is the electro-magnet with the exciter-coil $Sp$. $St$ is the source of current. $Sm$ is the current-meter. R is the regulating-resistance for regulating the exciting current and for setting the balance at zero. $Kw$ is an adjustable compensating-resistance, by which the branches 1 and 11 of the line are bridged over. The current-meter $Sm$ can so be divided, that the "normal" density of the gas with reference to a pressure of 0° and 760 mm. can be read directly. If the gas in $Wg$ is for instance under lesser pressure and higher temperature, the real density will be less than "normal". The buoyancy of the hollow sphere of the balance and the strength of the current required for setting the balance at zero, are consequently reduced. To derive the real density of the gas from the "normal", the former requires a correction by a multiplier, which is practically of equal value in all gases in respect of every pressure and every temperature. This correction can easily be determined experimentally by corresponding adjustment of the compensating-resistance $Kw$. Under suitable regulation of the bridge-current passing through $Kw$, it is possible to boost the current passing through the current-meter $Sm$ at the same ratio at the real and the "normal" gas-density differ and the corrected "normal" gas-density can be read directly from $Sm$.

In certain special scientific researches, some scientists have employed a magnetic process occasionally for micro-weighing, in which a magnet suspended below a balance-scale has been attracted by a coil, through which a current was passing. Compared with those devices, the present invention offers a number of advantages by arranging the magnet in longitudinal direction of the balance-beam, which are decisive for practical employment of the process.

The magnetic action is exceedingly sensitive to the weights applied as a consequence of the torsional effect produced by the attraction of one side of the balance beam and the repulsion of the other.

By supporting the magnet M upon the balance beam with its poles equidistantly spaced with relation to the fulcrum and by locating the magnet M' in close proximity to the fulcrum of the balance, the sensitivity of the device is preserved and the construction and adjustment of the balance beam rendered exceedingly simple.

Owing to the compact construction of the device it may be housed in a small casing such as a glass tube and the importance of such a feature will be readily appreciated when the device is used for ascertaining the density of flowing gases.

Claims:

1. In a beam balance, the combination with a beam, of a magnet mounted thereon and extending along the beam, and a second magnet disposed adjacent to the fulcrum of the beam and free from the beam, said second magnet being adapted to co-operate with the first magnet with variable effect whereby to overcome unbalance of the beam in use.

2. In a beam balance, the combination with a beam, of a magnet mounted thereon and extending along the beam, said magnet and beam being jointly balanced as a unit, and a second magnet free from the beam but within the magnetic field of the first magnet, said second magnet being adapted to co-operate with the first magnet with variable effect whereby to overcome unbalance of the beam in use.

3. In a beam balance, the combination with a beam, of a magnet mounted thereon and extending along the beam, said magnet and beam being jointly balanced as a unit, and a second magnet free from the beam and perpendicular to the first magnet intermediate the ends thereof, said second magnet being adapted to co-operate with the first magnet with variable effect whereby to overcome unbalance of the beam in use.

4. A balance for the determination of the density of fluids comprising a chamber for the fluid, a beam mounted in said chamber, a buoy mounted on said beam, a magnet disposed on said beam, an electromagnet adapted to influence the first magnet to move the beam, and means for varying the force of the electro-magnet to overcome the effect of the fluid on the buoy and return the beam to zero position.

5. A balance for the determination of the density of gases comprising a chamber for the gas, a beam mounted in said chamber, a buoy mounted on said beam, a magnet disposed on said beam, an electromagnet, means for varying the current through said electromagnet to vary the mutual forces of said magnets, and means for shunting the current in said electromagnet in accordance with the varying conditions of the gas.

6. A balance for the determination of the density of gases comprising a chamber for the gases, a beam mounted in said chamber, a buoy mounted on said beam, a magnet movable with said beam, an electromagnet, and circuit means associated with said electromagnet whereby the total current in the circuit is made proportional to the density of the gas under normal conditions of temperature and pressure.

7. In a beam balance, a beam, a magnet extending along the beam, an electromagnet disposed within the magnetic field of the first magnet, means for varying the effect of the electromagnet relative to the first magnet to overcome a force applied to the beam and means associated with the second magnet to indicate the degree of variation of magnetic force required to overcome the force applied to the beam.

8. In a beam balance, a beam, a magnet disposed on the beam with its poles equidistantly spaced from the fulcrum, an electromagnet, means for varying the force of the electromagnet relative to the first magnet to overcome a force applied to the beam and means associated with the electromagnet to indicate the degree of variation of magnetic force necessary to overcome the force applied to the beam.

9. In a beam balance, a beam, a magnet extending along and movable with the beam, an electromagnet disposed perpendicularly to the first magnet, means for varying the force of the electromagnet to overcome a force applied to the beam and to move the same to its zero position, and means to indicate the degree of variation of magnetic force required to return the beam to zero position.

10. A balance for the determination of the density of fluids comprising a fluid chamber, a beam pivotally mounted in said chamber, a buoy on said beam, a magnet disposed on said beam, an electromagnet, means for varying the force of the electromagnet to overcome the effect of the fluid on the buoy and to return the beam to zero position, and means to indicate the degree of variation of magnetic force required to return the beam to zero position.

In testimony whereof I affix my signature.

ALFRED STOCK.